United States Patent
Atasu et al.

(10) Patent No.: US 10,839,255 B2
(45) Date of Patent: Nov. 17, 2020

(54) LOAD-BALANCING TRAINING OF RECOMMENDER SYSTEM FOR HETEROGENEOUS SYSTEMS

(71) Applicant: International Business Machines Corporation, Armonk, NY (US)

(72) Inventors: Kubilay Atasu, Rueschlikon (CH); Celestine Duenner, Rueschlikon (CH); Thomas Mittelholzer, Zurich (CH); Thomas Parnell, Zürich (CH); Charalampos Pozidis, Thalwil (CH); Michail Vlachos, Rueschlikon (CH)

(73) Assignee: Internationl Business Machines Corporation, Armonk, NY (US)

( * ) Notice: Subject to any disclaimer, the term of this patent is extended or adjusted under 35 U.S.C. 154(b) by 857 days.

(21) Appl. No.: 15/595,314

(22) Filed: May 15, 2017

(65) Prior Publication Data
US 2018/0330192 A1    Nov. 15, 2018

(51) Int. Cl.
G06K 9/62     (2006.01)
G06F 16/435   (2019.01)
G06Q 30/02    (2012.01)
G06K 9/00     (2006.01)

(52) U.S. Cl.
CPC ......... *G06K 9/6223* (2013.01); *G06F 16/435* (2019.01); *G06K 9/00993* (2013.01); *G06K 9/6226* (2013.01); *G06Q 30/02* (2013.01)

(58) Field of Classification Search
CPC ......... G06N 20/00; G06N 20/10; G06N 20/20
See application file for complete search history.

(56) References Cited

U.S. PATENT DOCUMENTS

2016/0012088 A1    1/2016    Rossi et al.

FOREIGN PATENT DOCUMENTS

WO    2012034606 A2    3/2012

OTHER PUBLICATIONS

Atasu, Kubilay et al.; High-Performance Recommender System Training using Co-Clustering on CPU/GPU Clusters; IEEE; 2017 46th International Conference on Parallel Processing; pp. 372-381. (Year: 2017).*

Heckel, Reinhard et al.; Interpretable recommendations via overlapping co-clusters; IBM Research Group; pp. 1-11. (Year: 2016).*

Heckel, Reinhard et al.; Scalable and interpretable product recommendations via overlapping co-clustering; IEEE; 2017 IEEE 33rd International Conference on Data Engineering; pp. 1033-1044. (Year: 2017).*

(Continued)

*Primary Examiner* — Stanley K. Hill
(74) *Attorney, Agent, or Firm* — Harrington & Smith

(57) ABSTRACT

A method for parallelizing a training of a model using a matrix-factorization-based collaborative filtering algorithm may be provided. The model can be used in a recommender system for a plurality of users and a plurality of items. The method includes providing a sparse training data matrix, selecting a number of user-item co-clusters, and building a user model data matrix by matrix factorization such that a computational load for executing the determining updated elements of the factorized sparse training data matrix is evenly distributed across the heterogeneous computing resources.

18 Claims, 12 Drawing Sheets

(56) References Cited

OTHER PUBLICATIONS

Hsiang-Fu Yu, Cho-Jui Hsieh, Si Si, and Inderjit S. Dhillon, "Parallel Matrix Factorization for Recommender Systems" p. 15, dated Jun. 8, 2013. URL: http://www.cs.utexas.edu/~inderjit/public_papers/kais-pmf.pdf.

Ankur Narang, Abhinav Srivastava, Naga Praveen Kumar Katta, "High Performance Offline & Online Distributed Collaborative Filtering" 2012 IEEE 12th International Conference on Data Mining. p. 554. URL: https://www.cs.princeton.edu/~nkatta/papers/icdm12.

Hsiang-Fu Yu, Cho-Jui Hsieh, Si Si, Inderjit Dhillon, "Large-Scale Recommender Systems" retrieved May 9, 2017. URL: http://bigdata.ices.utexas.edu/project/large-scale-recommender-systems/.

Marcus Ljungblad, "Online Recommendations at Web-Scale Using Matrix Factorisation" dated Jun. 15, 2012. URL: http://people.ac.upc.edu/leandro/emdc/Marcus_Ljungblad_thesis.pdf.

Ankur Narang, Abhinav Srivastava, Naga Praveen Kumar Katta, "Distributed Scalable Collaborative Filtering Algorithm" IBM India Research Laboratory, New Delhi. pp. 353-365, 2011.

Reinhard Heckel, Michail Vlachos, "Interpretable Recommendations via Overlapping Co-Clusters" IBM Research Zurich retrieved May 15, 2017.

* cited by examiner 100    method 102    providing a sparse training data matrix 104    selecting a number of K co-clusters 106    building a user model data matrix 108    building groups of user columns 110    assigning the groups of user model data matrix to heterogeneous computing resources 112    iteratively determining updated elements f(u,k)

114    building groups of item rows 116    assigning the groups of item model data matrix Y to heterogeneous computing resources 118    iteratively determining updated elements f(i,k)

FIG. 1

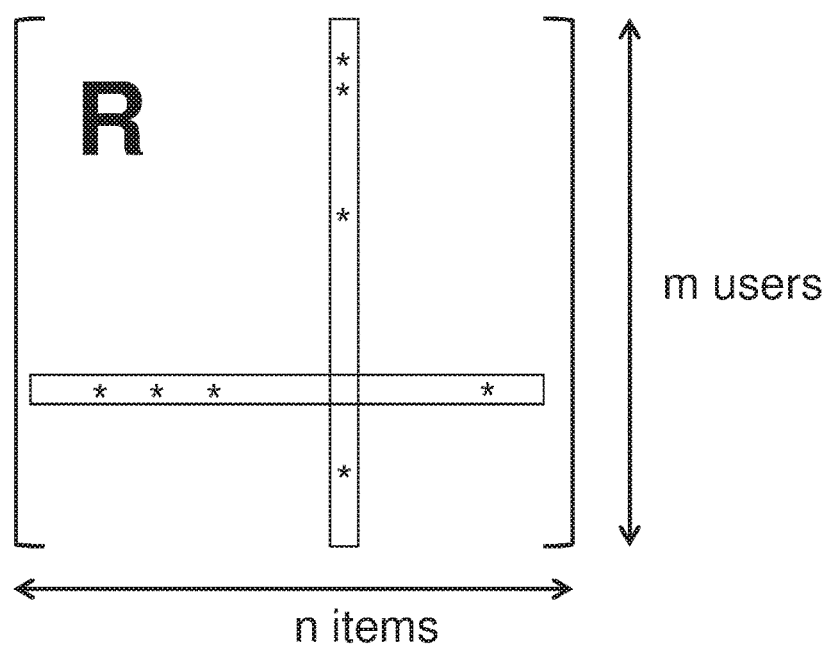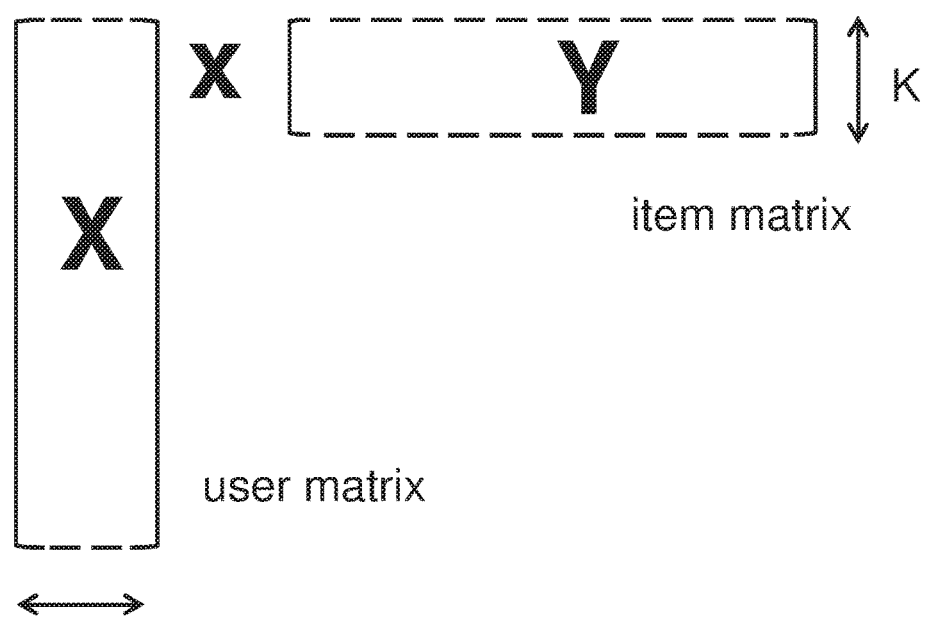
FIG. 3

600

```
i = ITEMS.first;
WHILE (i != ITEMS.end):
   FORALL ITEM_GROUPS p:
      p.items = ∅;
      p.ratings = 0;
   END
   p = ITEM_GROUPS. first;
   i = ITEMS. first;
   WHILE ((i != ITEMS.end)  and  (p != ITEM_GROUPS.end)):
      IF (i.ratings + p.ratings  ≤ p.capacity):
         p.items = p.items ∪ {i};
         p.ratings = p.ratings + i.ratings;
         i = ITEMS.next;
      ELSE:
         p = ITEM_GROUPS.next;
      END
   END
   IF (i != ITEMS.end):
      FORALL ITEM_GROUPS p: p.capacity = p.capacity * α; END
      i = ITEMS.first;
   END
END
```

```
Create balanced item groups

WHILE NOT CONVERGED:

#pragma omp parallel for
  FORALL ITEM_GROUPS p:
    FORALL ITEMS i in p:

END
  END pragma omp parallel for
  FORALL USER_GROUPS p:
    FORALL USERS u in p:

END
   END

END
```

FIG. 7

```
// Random assignment of a single item and all its users to each processor
FORALL PROCESSORS p:
  i = rand(ITEMS)
  p.items = {i};
  p.ratings = i.ratings;
  p.users = i.users;
  ITEMS = ITEMS − {i};
END
// Assign remaining items to the closest processors under capacity constraints
i = ITEMS.first;
WHILE (i != ITEMS.end):
  WHILE (i != ITEMS.end):
    p_set = p in PROCESSORS  s.t. (i.ratings + p.ratings ≤ p.capacity)
    IF (p.set = ∅):  BREAK; END
    p_min = argmax $_{p\ in\ p\_set}$ (i.users ∩ p.users)
    p_min.items = p_min.items ∪ {i};
    p_min.ratings = p_min.ratings + i.ratings;
    p_min.users = p_min.users ∪ i.users;
    i = ITEMS.next;
  END
  IF (i != ITEMS.end):
    FORALL PROCESSORS p: p.capacity = p.capacity * α; END
  END
END
```

FIG. 8

```
WHILE NOT CONVERGED:

FORALL ITEMS i:

$g_i = c + 2\lambda f_i - \sum_{u \in U(i)} f_u \times \left(1 - \exp(-\langle f_u, f_i \rangle)\right)^{-1}$ $f_i = f_i - \varepsilon_i g_i$
    END FORALL USERS u:

$g_u = c + 2\lambda f_u - \sum_{i \in I(u)} f_i \times \left(1 - \exp(-\langle f_i, f_u \rangle)\right)^{-1}$ $f_u = f_u - \varepsilon_u g_u$
    END

END
```

FIG. 10

LOAD-BALANCING TRAINING OF RECOMMENDER SYSTEM FOR HETEROGENEOUS SYSTEMS

FIELD OF THE INVENTION

The invention relates generally to a computer-implemented machine learning method, and more specifically, to a method for parallelizing a training of a model using a matrix-factorization-based collaborative filtering algorithm. The invention relates further to a related system and a computer program product.

BACKGROUND

In times of e-commerce, marketing strategies have diversified dramatically. Having as the only touch point an electronic transaction with a customer, it becomes harder to establish an intensive relationship initially. However, over time—based on the sequence of transactions and other social media activities—a potential customer may become more transparent and his behavior may become predictable. In this scenario, recommender systems play a key role.

Recommender systems seek to predict how a user (e.g., a customer) might rate a given item (e.g., a product) or the other way around: How a product may be rated by a customer. Over and above, in e-commerce (e.g., movie ratings), recommender systems have many popular applications, e.g., in social media (e.g., suggested friends), in world-wide web (e.g., most likely search queries), and in business analytics (e.g., suggested services). A popular way of producing recommendations is the use of collaborative filtering techniques, in which a model is built from a user's past behavior and similar decisions made by other users. This model is then used to predict the set of items that a user may have an interest in. Often, there are groups of users that are interested in a subset of the items. These groups are called co-clusters because they consist of both, users and items with similar patterns. These co-clusters may be overlapping because a user might have several different interests and an item may satisfy several different needs of different potential buyers. The recommendations can then be driven based on finding overlapping user-item co-clusters. In collaborative filtering based recommender systems, the overlapping user-item clusters are computed using a set of ratings given by the users to the items, e.g., the purchase history of customers can be used as a set of positive ratings given to a set of products. It has already been shown that the co-cluster identification problem can be addressed by reformulating it as a matrix factorization problem. Such a scenario can be solved using an efficient algorithm, whose complexity grows linearly with the number of ratings in a homogeneous computing environment.

SUMMARY

Various embodiments provide a computer-implemented method for parallelizing a training of a model using a matrix-factorization-based collaborative filtering algorithm, a system for parallelizing a training of a model using a matrix-factorization-based collaborative filtering algorithm, and a computer program product, as described by the subject-matter of the independent claims.

According to one aspect of the present invention, a computer-implemented method for parallelizing a training of a model using a matrix-factorization-based collaborative filtering algorithm may be provided. The model may be used in a recommender system for a plurality of users and a plurality of items. The method may comprise providing a sparse training data matrix R of dimension (m×n) in which columns represent m users, and rows represent n items such that non-zero entries in the columns of the training data matrix represent ratings of a user in respect to the items and selecting a number of K user-item co-clusters from a predefined number range of co-clusters and the conditions that K<<m and K<<n. Elements of the user-item co-clusters describe a relationship between user and items.

The method may comprise further, building a user model data matrix of dimension (m×K) and a user model data matrix of dimension (n×K). Each element f(u,k) in the item-user model data matrix X may become a resulting user affinity value of user u to user-item co-cluster k, and each element f(i,k) in the item model data matrix Y may become a resulting item affinity value of item i to user-item co-cluster k, wherein k∈{1 ... K}.

This may be performed by building groups of user columns in the sparse training data matrix R such that a total number of non-zero rating values in each group of the user columns is proportional to a computing capacity—i.e., performance—of one of heterogeneous computing resources, assigning the groups of the user model data matrix X to respective ones of the heterogeneous computing resources such that expected relative time differences between one update iteration and a next one for determining updated elements f(u,k) in the groups of the user model data matrix X are pairwise below a predefined relative time difference value, and iteratively determining updated elements f(u,k) in the groups of the user model data matrix X until convergence.

The building a user model data matrix of dimension (m×K) and a user model data matrix of dimension (n×K) may further comprise building groups of item rows in the sparse training data matrix R such that a total number of non-zero rating values in each group of the item rows is proportional to a computing capacity of one of heterogeneous computing resources, assigning the groups of the item model data matrix Y to respective ones of the heterogeneous computing resources such that expected relative time difference between one update iteration and a next one for determining updated elements f(i,k) in the groups of the item model data matrix Y are pairwise below a predefined relative time difference value, and iteratively determining updated elements f(i,k) in the groups of the item model data matrix Y until convergence.

This way, a computational load for executing the determining updated elements f(k,u) and f(i,k) may be evenly distributed across the heterogeneous computing resources.

According to another aspect of the present invention, a related system relating for parallelizing a training of a model using a matrix-factorization-based collaborative filtering algorithm may be provided.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

Preferred embodiments of the invention will be described, by way of example only, and with reference to the following drawings:

FIG. 1 shows a block diagram of an embodiment of the inventive computer-implemented method for parallelizing a training of a model using a matrix-factorization-based collaborative filtering algorithm.

Figure 2:
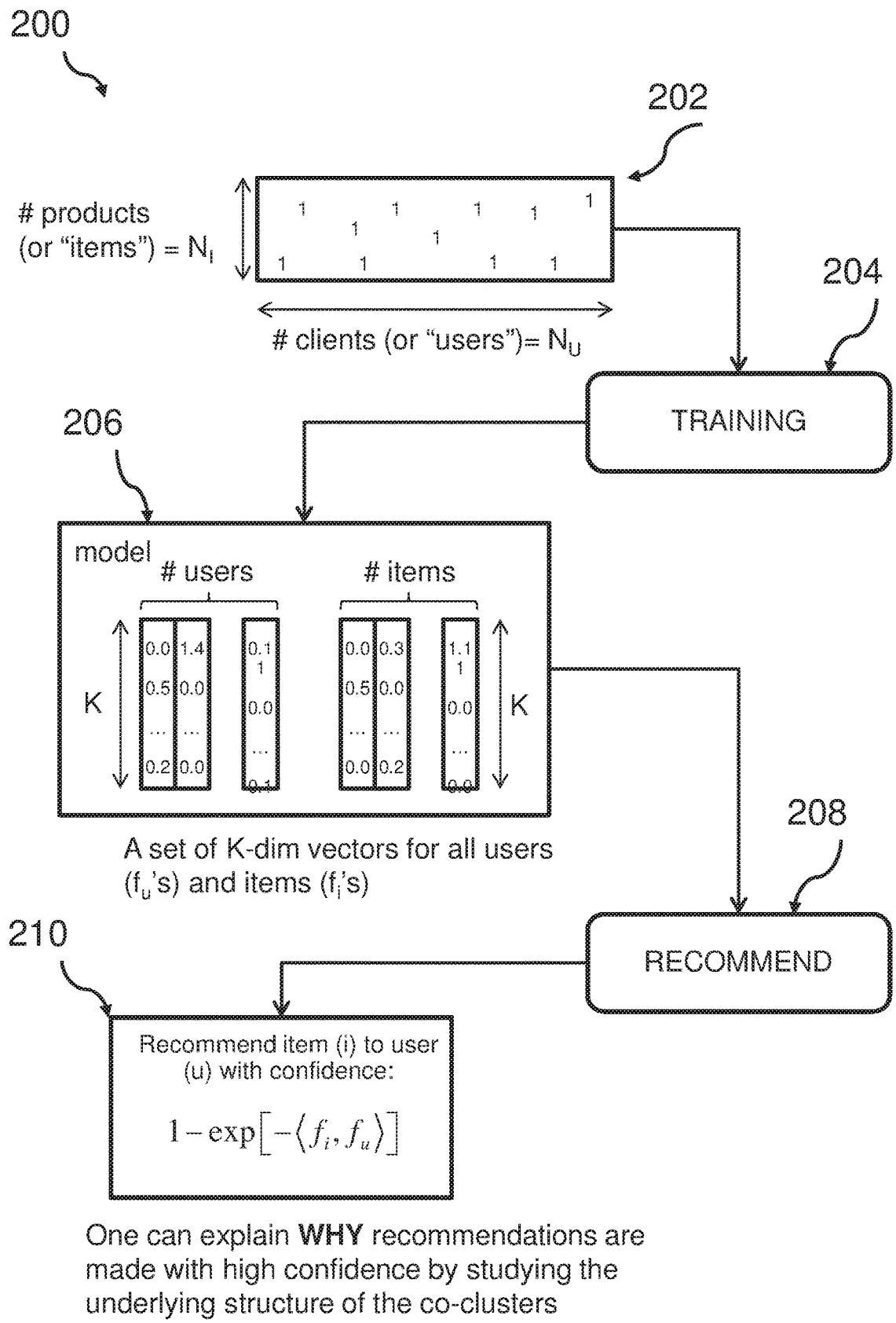

FIG. 2 illustrates the general framework that the proposed method is used for.

FIG. 3 shows one aspect of the used underlying mathematical concept: matrix factorization.

Figure 4:
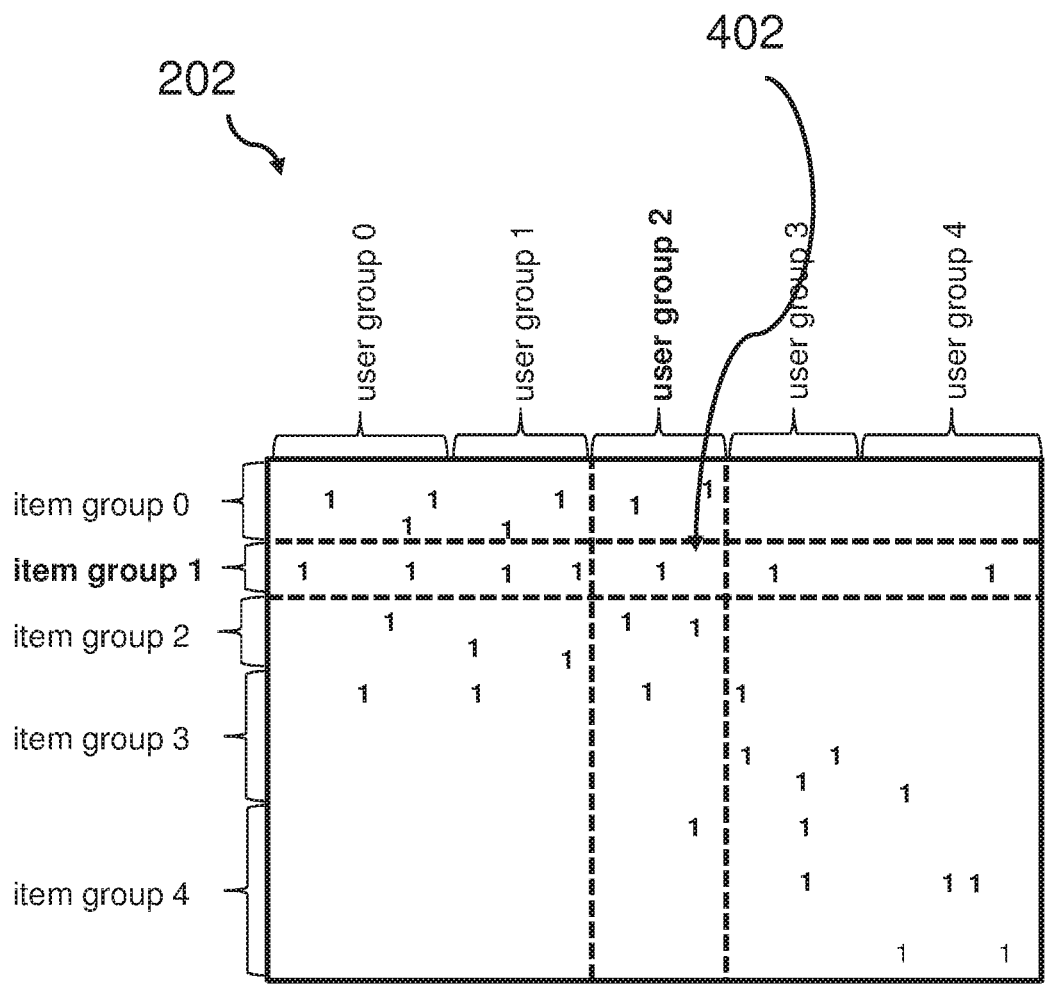

FIG. 4 illustrates a building of co-clusters in the sparse matrix.

Figure 5:
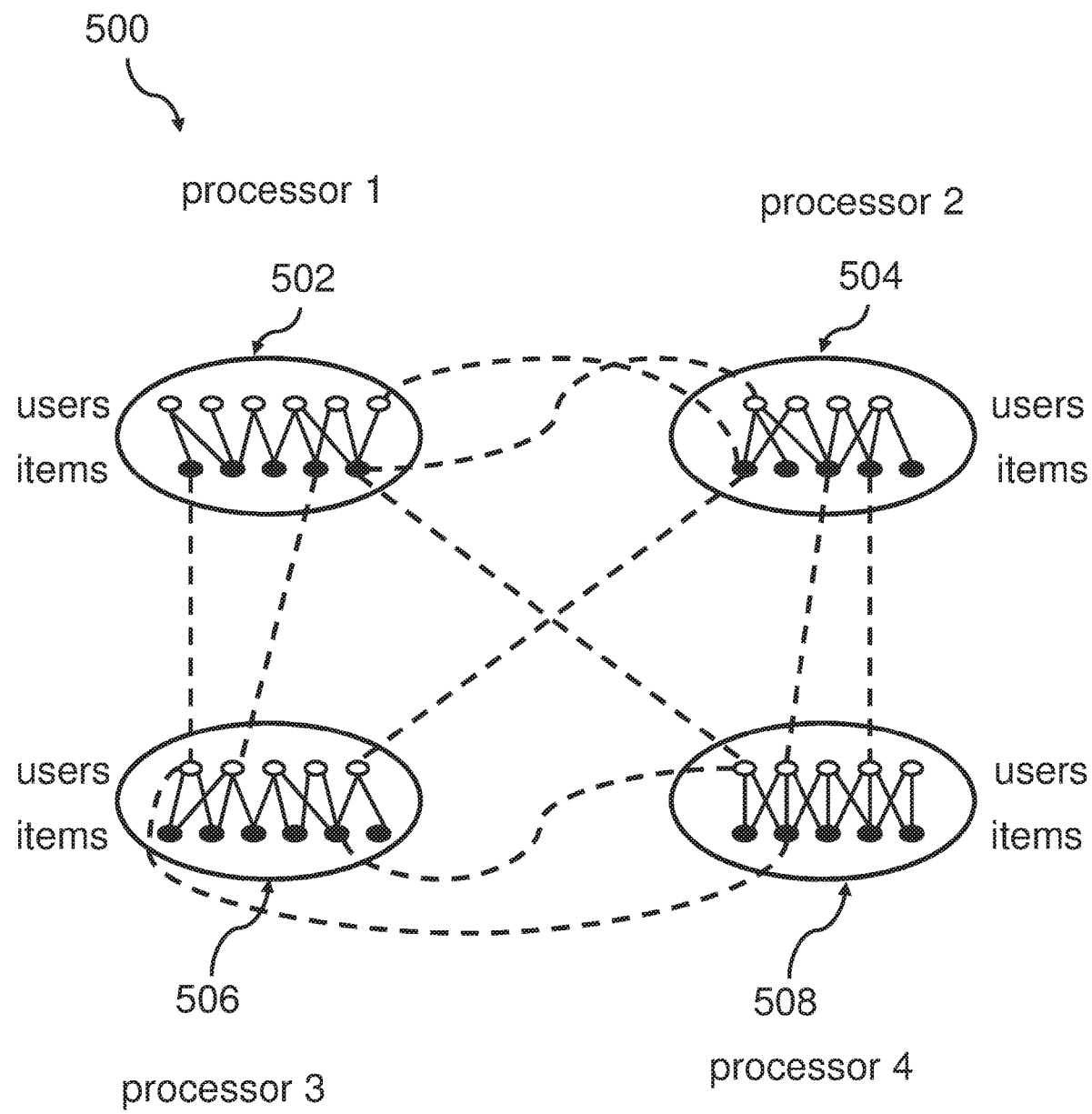

FIG. 5 illustrates graphically a diagram of the building of groups of user columns in the sparse training data matrix.

FIG. 6 shows pseudocode of an algorithm in which homogeneous computing resources are used for building the groups.

FIG. 7 shows the associated load balanced training for homogeneous computing resources.

FIG. 8 shows an embodiment of pseudo-code for the creation of balanced item groups.

Figure 9:

FIG. 9 shows an embodiment of a respective embodiment of pseudo-code for a creation of related balanced user groups.

FIG. 10 shows an embodiment of the Ocular algorithm.

Figure 11:
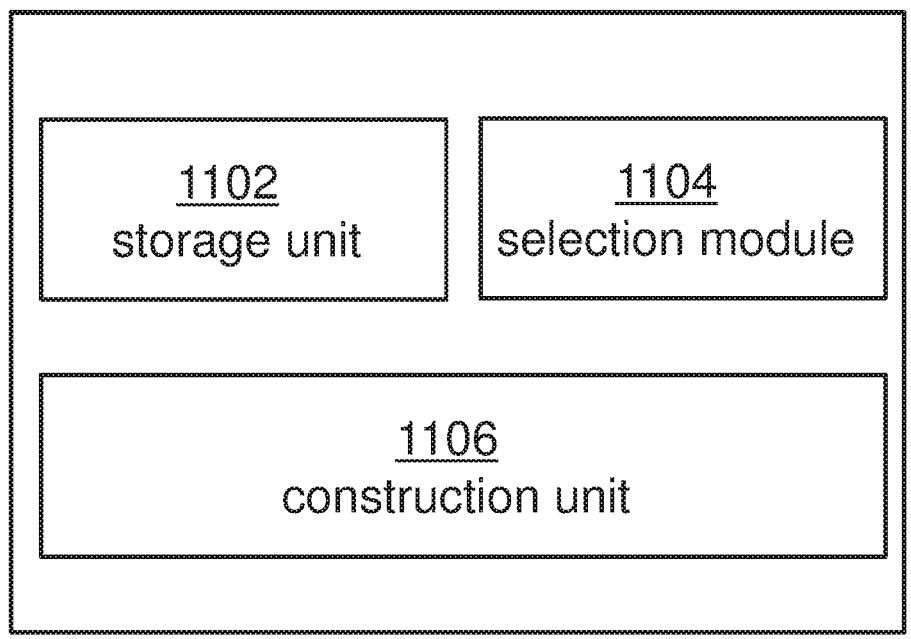

FIG. 11 shows an embodiment of the system for parallelizing a training of a model using a matrix-factorization-based collaborative filtering algorithm.

Figure 12:
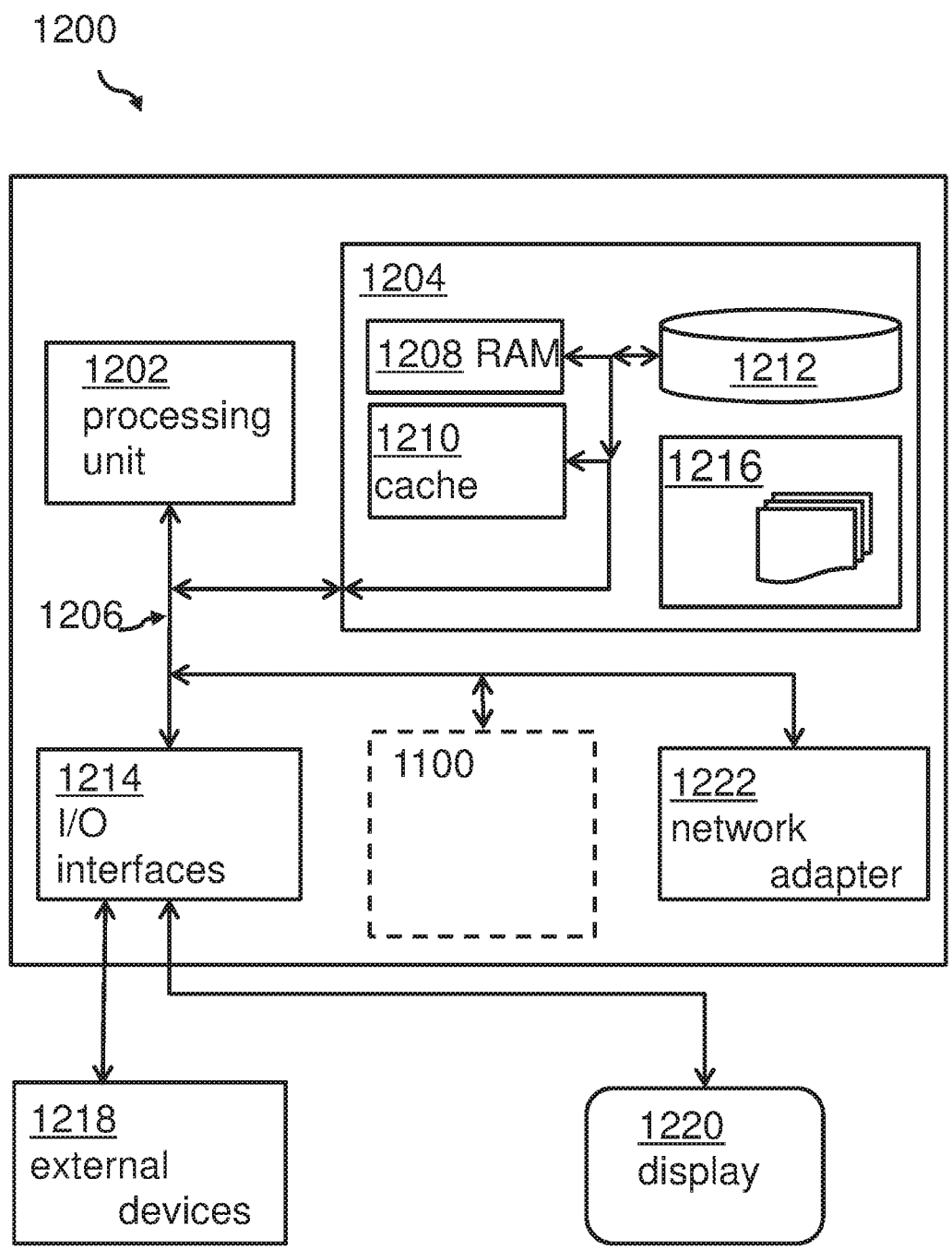

FIG. 12 shows a block diagram of a computing system suitable for executing program code related to the proposed method.

DETAILED DESCRIPTION

In the context of this description, the following conventions, terms and/or expressions may be used:

The term 'matrix-factorization-based collaborative filtering algorithm' may denote a filtering algorithm based on the mathematical technique known in linear algebra to decompose a matrix into a product of matrices (non-negative factorization principles). It may often be used in recommender systems, which are also known as collaborative filtering approach.

The term 'recommender system' may denote a subclass of information filtering systems that seek to predict the "rating" or "preference" that a user would give to an item. Recommender systems have become increasingly popular in recent years, and are utilized in a variety of areas including movies, music, news, books, research articles, search queries, social tags, and products in general. There are also recommender systems for experts, collaborators, jokes, restaurants, garments, financial services, life insurance, romantic partners (e.g., online dating), and Twitter pages.

The term 'users' may denote a first component in a first component/second component pair between which a relationship may exist. The terminology used throughout this document relates the user to a first component and an item to a second component.

The term 'sparse training data matrix R of dimension (m×n)' may denote in numerical analysis, a matrix in which most of the elements are zero. By contrast, if most of the elements are non-zero, then the matrix is considered dense. The number of zero-valued elements divided by the total number of elements (e.g., m×n for an m×n matrix) may be denoted as sparsity of the matrix (which is equal to 1 minus the density of the matrix).

The term 'user-item co-cluster' may, e.g., denote a group of users in the sparse training data matrix that are interested in a subset of the items. This concept may be generalized to a first (user) and a second (item) component. These groups are called core clusters because they consist of both users and item with similar patterns. These co-clusters may be overlapping because a user might have several different interests and an item may satisfy several different needs. The recommendation can then be driven based on finding overlapping user-item co-clusters. In collaborative filtering based recommender systems, the overlapping user-item co-clusters may be computed using a set of ratings given by the users to the items, e.g., the purchase history of customers can be used as a set of positive ratings given to a set of products. Often, the co-cluster identification problem may be formulated as a matrix factorization problem, and may be sourced using an efficient algorithm, whose complexity grows linearly with the number of ratings.

The term 'heterogeneous computing resources' may denote processors and comparable calculation engines having heterogeneous computing capacities, i.e., computing performance. The heterogeneous computing resources may be selected from a variety of different processors, graphical processing units, FPGAs, ASICs and so on.

The term 'computational load' may denote an amount of comparable calculations to be performed by a computing device or computing resource.

The term 'evenly distributed' may denote that a computational load may be distributed to computing resources having a different computing capacity that even if the amount of comparable calculations differs between the computing resources, the total amount of time required to finish the different amount of comparable calculations may be nearly the same.

The term 'load imbalance' may denote a value describing the time difference resulting from and on evenly distributed computational load.

The term 'cost function' may denote a concept often used in the context of machine learning and artificial intelligence. Given a specific task to solve, and a class of functions F, learning means using a set of observations to find $f^* \in F$ which solves the task in some optimal sense.

This may entail defining a cost function $C: F \to R$ such that, for the optimal solution $f^*$, $C(f^*) \leq C(f) \forall f \in F$—i.e., no solution has a cost less than the cost of the optimal solution.

The cost function C is an important concept in learning, as it is a measure of how far away a particular solution is from an optimal solution to the problem to be solved. Learning algorithms search through the solution space to find a function that has the smallest possible cost.

For applications where the solution is dependent on some data, the cost must necessarily be a function of the observations; otherwise we would not be modelling anything related to the data. It is frequently defined as a statistic to which only approximations can be made. The cost is minimized over a sample of the data rather than the entire distribution generating the data.

While it is possible to define some arbitrary ad hoc cost function, frequently a particular cost will be used, either because it has desirable properties (such as convexity) or because it arises naturally from a particular formulation of the problem (e.g., in a probabilistic formulation the posterior probability of the model can be used as an inverse cost). Ultimately, the cost function will depend on the desired task.

The proposed computer-implemented method for parallelizing a training of a model using a matrix-factorization-based collaborative filtering algorithm may offer multiple advantages and technical effects:

The proposed concept may be applied to a wide variety of different application areas of which recommender systems is only one example. One of the benefits is that heterogeneous computing resources may be used to implement the execution of the underlying algorithm instead of relying on homogeneous computing resources. I.e., the computing resources may have significant differences in performance and/or compute power. Using the known algorithms, such performance differences have a significant influence on the overall performance of the method because the weakest link—those computing resource having the lowest performance—may slow down the complete iterative process.

In contrast, the here proposed concept may guarantee that all parallel running computing resources may finish their respective calculations in more or less the same amount of time. The reason for this is that the assignment of groups to individual computing resources is done in such a way that users and items in a user-item co-cluster are assigned to process orders having a proportional compute power if compared to the size of the user-item co-cluster.

In addition to that the grouping process is performed such that only minimal inter-processor communication—which may require substantial computing and communication overhead—may be required between the different heterogeneous computing resources. This may result in a significant performance gain if compared to the known technology.

Thus, a further benefit of the communication-optimize grouping is that the data partitions become less correlated. This property allows to optimize the parameters of the learning algorithm, so that more iterative steps are taken on one of the components (user, item) before communicating the local updates to the model parameters of the other component (i.e., further reducing the overhead associated with communication in the iterative learning algorithm). Nominally, if the data partitions are highly correlated, performing more local iteration tends to slow down the convergence. However, if one applies such a communication-optimize grouping, it may be possible to increase the number of local iterations without significantly affecting convergence properties of the algorithm. As an example, one may be able to significantly speed-up the convergence of the known training algorithm by performing the gradient descent steps on each processor (i.e., computing resource) before communicating the updated model vectors to the other processors, provided that such a communication-optimize grouping has been employed.

In other words, the grouping and the co-clustering algorithms may be used within a feedback loop to improve the performance of the training phase.

In the following, additional embodiments of the method—which may also be applicable to the system—will be discussed:

According to one permissive embodiment of the method, the steps of (i) iteratively determining updated elements f(u,k) in the groups of the user model data, and (ii) iteratively determining updated elements f(i,k) in the groups of the item model data may be performed interleaved. However, a strict interleaving may not be required. It may also be possible that several iterations for f(u,k) may be performed before a next iteration step for f(i.k) may be performed.

Thus, according to another permissive embodiment, the method may comprise executing or performing a plurality of steps of iteratively determining updated elements f(u,k) in the groups of the user model data before a step of iteratively determining updated elements f(i,k) in the groups of the item model data is performed.

Alternatively, an embodiment of the method may comprise an execution of a plurality of steps of iteratively determining updated elements f(i,k) in the groups of the item model data before a step of iteratively determining updated elements f(u,k) in the groups of the user model data is performed.

Thus, the method may be symmetrical in respect to the initial step (i.e., either f(u,k) or f(i,k)) the conversion process is started from.

According to one advantageous embodiment of the method, building groups of item rows in the sparse training data matrix R may be performed depending on the determining groups of user columns in the sparse training data matrix R—i.e., not independently, but under a condition such that (a) a total volume of communication between the heterogeneous computing resources may be minimized when performing the executing the determining updated elements f(u,k) and f(i,k), and (b) the computational load for executing the determining updated elements f(u,k) and f(i,k) is maintained evenly distributed across the heterogeneous computing resources by (i) defining edges in user-item pairs indicative of an existing rating from a user for an item in the sparse training data matrix R, and (ii) minimizing a total number of edges between the heterogeneous computing resources when performing the executing the determination of updated elements f(u,k) and f(i,k) by applying a min-cut algorithm.

In computer science and graph theory, the min-cut algorithm or Karger's algorithm is a randomized algorithm to compute a minimum cut of a connected graph. It was invented by David Karger and first published in 1993. The basic idea of the algorithm is based on the concept of contraction of an edge in an undirected graph. Informally speaking, the contraction of an edge merges the nodes and into one, reducing the total number of nodes of the graph by one. All other edges connecting either or are "reattached" to the merged node, effectively producing a multigraph. Karger's basic algorithm iteratively contracts randomly chosen edges until only two nodes remain; those nodes represent a cut in the original graph. By iterating this basic algorithm a sufficient number of times, a minimum cut can be found with high probability. Hence, the Min-cut algorithms try to compute a balanced partitioning of a graph such that the number of graph edges that span across different partitions are minimized.

According to one preferred embodiment of the method, the assigning the groups of the user model data matrix X to respective ones of the heterogeneous computing resources (according to claim 1) may be executed under the condition $$p.\text{capacity} = \alpha(cp\ R'/C),$$

wherein
p.capacity is a total number of ratings assignable to one of the heterogeneous computing resources,
cp is a relative compute power of a core of one of the heterogeneous computing resources,
R' is the total number of ratings in the sparse training data matrix R,
C is the sum of all relative compute power of all cores of the heterogeneous computing resources, and
α is a value >1 and represents a load imbalance factor indicative of a measure of a maximum load imbalance between cores of the heterogeneous computing resources.

In doing so, it may be ensured that only a little imbalance between elements of the heterogeneous computing resource may exist. Hence, all computing resource may finish its calculation approximately at the same time.

According to one further advantageous embodiment, the method may comprise, after the steps of (i) the building groups of user columns in the sparse training data matrix R, (ii) the assigning the groups of the user model data matrix X to respective ones of the heterogeneous computing resources, (iii) the building groups of item rows in the sparse training data matrix R, and (iv) the assigning the groups of the item model data matrix Y to respective ones of the heterogeneous computing resources (all steps (i) to (iv) according to claim 1), performing the following steps iteratively (a) the executing determining updated elements f(u,k) in the groups of user data model matrix X (also according to claim 1) and (b) executing determining updated elements f(i,k) in the groups of the item model data matrix Y (as well from claim) starting with the step (a).

In an alternative advantageous embodiment, the sequence of iteratively performing steps (a) and (b) may be reversed:

According to this alternative advantageous embodiment, the method may comprise performing after the steps of (i) the building groups of user columns in the sparse training data matrix R, (ii) the assigning the groups of the user model data matrix X to respective ones of the heterogeneous computing resources, (iii) the building groups of item rows in the sparse training data matrix R, and (iv) the assigning the groups of the item model data matrix Y to respective ones of the heterogeneous computing resources, the following steps iteratively (a) the executing determining updated elements f(u,k) in the groups of user data model matrix X, and (b) executing determining updated elements f(i,k) in the groups of the item model data matrix Y, starting with the step (b).

Thus, it does not matter from where the algorithm may start. A conversion may be reached in one or the other implementation way.

According to one additionally preferred embodiment of the method, the convergence of the step of executing determining updated elements f(u,k) in the groups of the user model data matrix X may be indicated by minimizing a cost function. I.e., if the relative cost function value from one iteration step to a next one may undercut a predefined threshold value, the calculation may be terminated because the model reached maturity.

According to one possible embodiment of the method, the cost function may be given by $$Q = -\log L + \lambda \Sigma_i |f_i|^2 + \lambda \Sigma_i |f_u|^2,$$

wherein
L is a likelihood function,
λ is a parameter of the algorithm,
$|f_i|^2$ is the square of the Euclidian norm of vector $f_i$, $f_i \in (r^+)^K$, $r^+$ a non-negative real number (e.g., 1 to 5) and, $|f_u|^2$ is the square of the Euclidian norm of vector $f_u$, $f_u \in (r^+)^K$, K=dimension of f which is greater or equal 1. Hence, the calculation may be performed using straight forward fast implementable operators.

According to a further possible embodiment of the method, the likelihood function L may be given by $$L = \Pi_{(u,i):r\_u\_i=1} Pr(r\_u\_i=1) * \Pi_{(u,i):r\_u\_i=0}(1-Pr(r\_u\_i=1)),$$

wherein
a Model Probability Pr is given by $$Pr(r\_u\_i=1) = 1 - \exp[1 - \langle f_u, f_i \rangle],$$

wherein
$\langle f_u, f_i \rangle$ is the scalar product of the vector $f_u$ and $f_i$, and K=number of co-clusters (greater or equal 1).

It may further be assumed that the sparse training matrix R may sparsely be filled with "1": $R=[r_{u,i}] \in \{0,1\}^{Nu \times Ni}$ and $f_u \in (A^+)^K$ and $f_i \in (A^+)^K$, wherein $A^+$ is a Real number, preferably between 0 and 1.

According to one further possible embodiment of the method, each of the heterogeneous computing resources may be selected out of the group comprising a single-core central processing unit, a multi-core central processing unit, a graphics processing unit, a field programmable gate array, a hardware accelerator and an application-specific integrated circuit.

Additional options for computing the heterogeneous computing resources may also be selected from a software thread, a software process and/or a Spark worker. Also, special purpose accelerators may be among the selectable heterogeneous computing resources.

FIG. 1 shows an embodiment of the inventive computer-implemented method 100 for parallelizing a training of a model using a matrix-factorization-based collaborative filtering algorithm. The model being is used in a recommender system for a plurality of users and a plurality of items.

It may be understood by a skilled person that instead of the user, reference may alternatively be made to a "first component" and that instead of the item, reference may alternatively be made to a "second component". The terms "item" and "user" have only been used for comprehensibility reasons throughout this document. Another relationship between two potentially depending components may be used instead.

The method 100 comprises providing, 102, a sparse training data matrix R of dimension (m×n) in which columns represent m users and rows represent n items such that non-zero entries in the columns of the training data matrix represent ratings of a user in respect to the items. For a flow diagram regarding the underlying general activities, refer to FIG. 2. Generally, the values in this sparse training data matrix R represent a relationship between a first component—e.g., a user—and a second component—e.g., an item—the user may have bought or rated. Cross points in the matrix R, not showing a relationship between a user and the related item, may comprise "0s"; these "0s" in the exemplary matrixes are not shown throughout this document.

The method comprises further selecting, 104, a number of K user-item co-clusters from a predefined number range of user-item co-clusters—typically using a predefined start parameter between 10 and 200 (values outside this range are possible). K<<m and K<<n; elements of the co-clusters describe a relationship or affinity between user and items.

Additionally, the method 100 comprises building, 106, a user model data matrix of dimension (m×K) and an item model data matrix of dimension (n×K) using the principles of matrix factorization. Each element f(u,k) in the user model data matrix X becomes a resulting user affinity value of user u to user-item co-cluster k, and wherein each element f(i,k) in the item model data matrix Y becomes a resulting item affinity value of item i to user-item co-cluster k, wherein k∈{1 . . . K}.

This is performed by building, 108, groups of user columns in the sparse training data matrix R—as part of the step of building, 106, the user model data matrix—such that a total number of non-zero rating values in each group of the user columns is proportional to a computing capacity—i.e., computing performance—of one of heterogeneous computing resources. The computing resources comprise generally all elements designed to perform computational operations like CPUs, GPUs, FPGAs (field programmable gate array), ASICs (application specific integrated circuit), all kinds of hardware accelerators or any other special hardware circuitry for performing competition tasks. It may be noted that the computing resources are heterogeneous in the sense that not all computing resources for all groups have identical computer power, computing capacity or computing performance. However, they vary in their performance and/or capabilities.

Additionally, as a next sub-step of the as part of the step of building, 106, the user model data matrix, the method comprises assigning, 110, the groups of the user model data matrix X to respective ones—in particular, in accordance with the built groups from the previous step—of the heterogeneous computing resources such that expected relative time differences between one update iteration and a next one for determining updated elements f(u,k) in the groups of the user model data matrix X are pairwise below a predefined relative time difference value. This may reflect a maximum allowed load imbalance between the different heterogeneous computing resources according to a grouping heuristic.

In addition, the method comprises iteratively determining, 112, updated elements f(u,k) in the groups of the user model data matrix X until convergence. This is done until the cost function J (see above) is minimized.

Furthermore, the method comprises—in particular as part of the step of building, 106, the user model data matrix— building, 114, groups of item rows in the sparse training data matrix R such that a total number of non-zero rating values in each group of the item rows is proportional to a computing capacity of one of heterogeneous computing resources, assigning, 116, the groups of the item model data matrix Y to respective ones of the heterogeneous computing resources such that expected relative time differences between one update iteration and a next one for determining updated elements f(i,k) in the groups of the item model data matrix Y are pairwise below a predefined relative time difference value, and iteratively determining, 118, updated elements f(i,k) in the groups of the item model data matrix Y until convergence. Also here applies the boundary condition that the cost function J is minimized.

This way, the computational load for executing the determining updated elements f(k,u) and f(i,k) is evenly distributed across the heterogeneous computing resources. Hence, all cycles through the algorithm should require roughly the same amount of time.

The here described method focuses on building, 106, a user model data matrix. Instead, the method may also focus on building an item model data matrix. From a mathematical point of view both approaches are symmetrical. As a consequence, the sub-steps of building, 106, a user model data matrix would have to be adapted accordingly.

FIG. 2 illustrates the general framework that the here proposed method is used for. Initially, a sparse matrix 202 is given. In this matrix 202, at some cross points of horizontal item rows and vertical user columns rating values are available. These have been shown as "1"; however, these cross points may also have other rating values, e.g., 1, . . . , 5. It may, exemplary, illustrate a rating a user has given to a specific product which he may or may not have purchased. Other examples in other industries may exist, like social media, public voting, a phone call being made at a specific time and for a specific duration, etc.

Based on this sparse matrix 202, and the related cross point data, which have been measured in the past, a training 204 for a development of a prediction model 206 may be performed. The model comprises a number of user vectors of dimension K as well as a number of item vectors, also of dimension K. Based on this model 206, recommendations 208 may be developed in order to predict how a specific item may be recommended/rated by a specific user with a related confidence factor given by box 210 of FIG. 2. In the known mathematical theory behind, it turns out that one is able to explain why recommendations with a high confidence factor may be made by studying the underlying structure of co-clusters developed during the training phase 204.

FIG. 3 shows a diagram 300 of one aspect of the used underlying mathematical concept: matrix factorization. It can be shown that sparse rating matrix R (compare FIG. 2) of dimension m×n may be divided into a matrix product of a user matrix X of dimension m×K and an item matrix Y of dimension K×n, wherein K represents a number of co-clusters identified in the sparse rating matrix R. It may also be assumed that K<<m and K<<n, wherein m and/or n is at least twice the number of K, e.g., 5 or 10 times as big. It may be noted that the number of user-item co-clusters K may be a start parameter of the underlying method; K may be number typically be in a range from 10 to 200. However, other values may be possible. It may be noted that the user matrix X is equivalent to the vectors "# users" and that the matrix Y is equivalent to the vectors "# items", eventually in a transposed version.

As background, the Ocular algorithm—which may be seen as a predecessor of the here proposed concept—may be described: Suppose that there are K co-clusters. Affiliation of a user u with the K co-clusters is given by a K-dimensional vector $f_u$, and affiliation of an item i with the K co-clusters is given by a K-dimensional vector $f_i$. Let $f_{i,j}$ denote the j-th entry of $f_i$, and similarly, let $f_{u,j}$ denote the jth entry of $f_u$, where j∈{1 . . . K}. The entries of $f_i$ and $f_u$ vectors are defined to be non-negative. The larger the affinity between an item i and a co-cluster j, the larger the value of $f_{i,j}$ is. When there is no affinity between an item i and a co-cluster j, we have $f_{i,j}=0$.

Given a history of the ratings the users have expressed for the items, the Ocular training algorithm iteratively updates the $f_i$ and $f_u$ vectors using a cyclic block coordinate descent algorithm. Once f i and f u vectors are available, the probability that a user u and an item i belong to a cluster j can be computed. FIG. 10 shows the way Ocular training algorithm iteratively updates $f_i$ and $f_u$ vectors. First, the gradient vectors $g_i$ are computed for items and then the $f_i$ vectors are updated using the gradient vectors $g_i$. After that, the gradient vectors $g_u$ are computed for users and then the $f_u$ vectors are updated using the gradient vectors $g_u$. The iterations are continued until the algorithm converges.

The computation within the FORALL loops shown in FIG. 10 is independent for every user and item. Therefore, the algorithm is embarrassingly parallel: the computation for each user and for each item can be carried out on a separate compute resource. However, in practice, the number of items and the number of users is each significantly higher than the amount of parallelism available. Therefore, the workload has to be distributed among the available compute resources. A very straightforward workload distribution approach would be to distribute the items and the users evenly across the available compute resources. However, such an approach creates a workload imbalance because different items and users have different computational requirements. In general, the complexity of updating an $f_i$ vector grows linearly with the number of ratings given to item i. Similar considerations hold for users. Thus, it is a useful approach to distribute the workload evenly based on the number of ratings.

FIG. 4 illustrates a building of user-item co-clusters in the sparse matrix 202. In the matrix 202 shown, a first user group—here the user group 2—and a first item group—here the item group 1—build a sub-matrix 402 as a user-item co-cluster in which the relationship between the members of the user group 2 and the items of the item group 1 have a comparably high correlation. It may be noted that only for illustration purposes only one "1" is shown in the sub-matrix 402. In reality, each user group and each item group have a plurality of columns and rows, respectively. This sub-matrix 402 may be denoted as co-cluster.

FIG. 5 illustrates graphically a diagram 500 of the building, 108, of groups 502, 504, 506, 508 of user columns in the sparse training data matrix R such that a total number of non-zero rating values in each group of the user columns is proportional to an assigned computing capacity. Each of the groups 502, 504, 506, 508 comprises users—illustrated as white circles—as well as related items—illustrated as black dots. One of the inventive elements of the here proposed concept is that the building the groups and the assigning of these groups to one of the heterogeneous computing resources is done in such a way that the time to calculate the resulting variables f(u,k) and f(i,k) requires more or less the same amount of time, even if heterogeneous computing resources are used.

As an example to illustrate this the first group 502 is assigned to a processor 1, the second group 544 is assigned to a processor 2, the third group 506 is assigned to a processor 3, and the fourth group 508 is assigned to a processor 4.

As a further boundary condition, the groups are built in such a way that a minimum of calculations have to be performed across groups; thus, the dotted lines between the groups 502, 504, 506, 508 should be kept at a minimum. To understand this, it may be mentioned that the lines between users and items within the group illustrate dependencies that the respective user and the respective item—i.e., ratings exists for the respective user/item pair. As long as the calculation for these pairs is done on the same computing resource, a cross computing resource communication is not required. Typically these cross-computing resource communications require an over-proportionally amount of time. Thus, they should be minimized and only happen in exceptional cases. One of these cases is that the right most item of group 502 is dependent on the leftmost user of group 504. A skilled person may understand the other dependencies between the groups 502, 504, 506, 508 and the respective users and items easily (dotted lines).

Hence, the algorithm for calculating the user-item matrix may use explicitly the heterogeneous computing resources—in contrast to known technologies—and fulfill an additional boundary condition in that the total computation time within each group is roughly identical.

FIG. 6 shows a block diagram of an algorithm 600 in which homogeneous computing resources are used for building the groups. The ratings are balanced evenly, thus a bin-packing problem needs to be solved by a linear-time algorithm, wherein a is the load imbalance factor. The same algorithm is applied for user groups.

Accordingly, FIG. 7 shows the associated load balanced training 700 for homogeneous computing resources. Namely, a load balancing based on a number of ratings by assigning a capacity to each compute unit—i.e., maximum number ratings for each unit—apply bin packing separately for items and users and which produces item and user groups; parallelize across item groups (outer for loop), parallelize across user groups (inner for loop), shared-memory implementation using OpenMP (an open source library or application programming interface that supports multi-platform shared memory mighty processing), and equivalent distributed implementation using MPI (message passing interface) and using for the initial data distribution: scatter, broadcast. At the end of each iteration gathering and broadcasting steps may be performed.

FIG. 8 shows an embodiment of pseudo-code 800 for the creation of balanced item group and FIG. 9 a respective embodiment of pseudo-code 900 for a creation of related balanced user groups. These last two figures are applicable for the here proposed usage and optimization of inhomogeneous or heterogeneous computing resources.

FIG. 10 shows an embodiment of the underlying Ocular algorithm, iterating through the items and then through the users. The variables C, $\lambda$, $\varepsilon$ represent model parameters which may experimentally be determined. $g_i$ may represent a gradient vector, which may firstly be calculated. Form here, the $f_u$ and $f_i$ for the user and items are computed.

FIG. 11 shows an embodiment of the system 1100 for parallelizing a training of a model using a matrix-factorization-based collaborative filtering algorithm. The model may be used in a recommender system for a plurality of users and a plurality of items. The system comprises a storage unit 1102 adapted for providing a sparse training data matrix R of dimension (m×n) in which columns represent m users and rows represent n items such that non-zero entries in the columns of the training data matrix represent ratings of a user in respect to the items, and a selection module 1104 adapted for selecting a number of K co-clusters from a predefined number range of co-clusters, wherein K<<m and K<<n, and wherein elements of the co-clusters describe a relationship between users and items. The storage unit 1102, selection module 1104, and/or the construction unit 1106 may be implemented in hardware and/or in software, e.g., in one or more data processors, one or more memories, and/or one or more computer program codes.

Additionally, the system comprises a function with a construction unit 1106 adapted for building a user model data matrix of dimension (m×K) and an item model data matrix of dimension (n×K), wherein each element f(u,k) in the user model data matrix X becomes a resulting user affinity value of user u to user-item co-cluster k, and wherein each element f(i,k) in the item model data matrix Y becomes a resulting item affinity value of item i to user-item co-cluster k, wherein k∊{1 . . . K}.

The construction unit 1106 is also adapted for building groups of user columns in the sparse training data matrix R such that a total number of non-zero rating values in each group of the user columns is proportional to a computing capacity of one of heterogeneous computing resources, assigning the groups of the user model data matrix X to respective ones of the heterogeneous computing resources such that expected relative time differences between one update iteration and a next one for determining updated elements f(u,k) in the groups of the user model data matrix X are pairwise below a predefined relative time difference value, and iteratively determining updated elements f(u,k) in the groups of the user model data matrix X until convergence.

Furthermore, the construction unit 1106 is also adapted for building groups of item rows in the sparse training data matrix R such that a total number of non-zero rating values in each group of the item rows is proportional to a computing capacity of one of heterogeneous computing resources, assigning the groups of the item model data matrix Y to respective ones of the heterogeneous computing resources such that expected relative time differences between one update iteration and a next one for determining updated elements f(i,k) in the groups of the item model data matrix Y are pairwise below a predefined relative time difference value, and iteratively determining updated elements f(i,k) in the groups of the item model data matrix Y until convergence, such that a computational load for executing the determining updated elements f(k,u) and f(i,k) is evenly distributed across the heterogeneous computing resources.

Embodiments of the invention may be implemented together with virtually any type of computer, regardless of the platform being suitable for storing and/or executing program code. FIG. 12 shows, as an example, a computing system 1200 suitable for executing program code related to the proposed method.

The computing system 1200 is only one example of a suitable computer system and is not intended to suggest any limitation as to the scope of use or functionality of embodiments of the invention described herein. Regardless, computer system 1200 is capable of being implemented and/or performing any of the functionality set forth hereinabove. In the computer system 1200, there are components, which are operational with numerous other general purpose or special purpose computing system environments or configurations. Examples of well-known computing systems, environments, and/or configurations that may be suitable for use with computer system/server 1200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 1200 may be described in the general context of computer system-executable instructions, such as program modules, being executed by a computer system 1200. Generally, program modules may include routines, programs, objects, components, logic, data structures, and so on that perform particular tasks or implement particular abstract data types. Computer system/server 1200 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 1200 is shown in the form of a general-purpose computing device. The components of computer system/server 1200 may include, but are not limited to, one or more processors or processing units 1202, a system memory 1204, and a bus 1206 that couples various system components including system memory 1204 to the processor 1202. Bus 1206 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1200 typically includes a variety of computer system readable media. Such media may be any available media that is accessible by computer system/server 1200, and it includes both, volatile and non-volatile media, removable and non-removable media.

The system memory 1204 may include computer system readable media in the form of volatile memory, such as random access memory (RAM) 1208 and/or cache memory 1210. Computer system/server 1200 may further include other removable/non-removable, volatile/non-volatile computer system storage media. By way of example only, storage system 1212 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1206 by one or more data media interfaces. As will be further depicted and described below, memory 1204 may include at least one program product having a set (e.g., at least one) of program modules that are configured to carry out the functions of embodiments of the invention.

The program/utility, having a set (at least one) of program modules 1216, may be stored in memory 1204 by way of example, and not limitation, as well as an operating system, one or more application programs, other program modules, and program data. Each of the operating system, one or more application programs, other program modules, and program data or some combination thereof, may include an implementation of a networking environment. Program modules 1216 generally carry out the functions and/or methodologies of embodiments of the invention as described herein.

The computer system/server 1200 may also communicate with one or more external devices 1218 such as a keyboard, a pointing device, a display 1220, etc.; one or more devices that enable a user to interact with computer system/server 1200; and/or any devices (e.g., network card, modem, etc.) that enable computer system/server 1200 to communicate with one or more other computing devices. Such communication can occur via Input/Output (I/O) interfaces 1214. Still yet, computer system/server 1200 may communicate with one or more networks such as a local area network (LAN), a general wide area network (WAN), and/or a public network (e.g., the Internet) via network adapter 1222. As depicted, network adapter 1222 may communicate with the other components of computer system/server 1200 via bus 1206. It should be understood that although not shown, other hardware and/or software components could be used in conjunction with computer system/server 1200. Examples, include, but are not limited to: microcode, device drivers, redundant processing units, external disk drive arrays, RAID systems, tape drives, and data archival storage systems, etc.

Additionally, a system 1100 for parallelizing a training of a model using a matrix-factorization-based collaborative filtering algorithm may be attached to the bus system 1206.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for parallelizing a training of a model using a matrix-factorization-based collaborative filtering algorithm, the model being used in a recommender system for a plurality of users and a plurality of items, the method comprising
    providing a sparse training data matrix R of dimension (m×n) in which columns represent m users and rows represent n items such that non-zero entries in the columns of the training data matrix represent ratings of a user in respect to the items,
    selecting a number of K user-item co-clusters from a predefined number range of co-clusters, wherein K<<m and K<<n, and wherein elements of the user-item co-clusters describe a relationship between user and items,
    building a user model data matrix X of dimension (m×K) and an item model data matrix Y of dimension (n×K), wherein each element f(u,k) in the user model data matrix X becomes a resulting user affinity value of user u to user-item co-cluster k, and wherein each element f(i,k) in the item model data matrix Y becomes a resulting item affinity value of item i to user-item co-cluster k, wherein k∈{1 . . . K}, by
        building groups of user columns in the sparse training data matrix R such that a total number of non-zero rating values in each group of the user columns is proportional to a computing capacity of one of heterogeneous computing resources,
        assigning the groups of the user model data matrix X to respective ones of the heterogeneous computing resources such that expected relative time differences between one update iteration and a next one for determining updated element f(u,k) in the groups of the user model data matrix X are pairwise below a predefined relative time difference value,
        iteratively determining updated elements f(u,k) in the groups of the user model data matrix X until convergence,
        building groups of item rows in the sparse training data matrix R such that a total number of non-zero rating values in each group of the item rows is proportional to a computing capacity of one of heterogeneous computing resources,
        assigning the groups of the item model data matrix Y to respective ones of the heterogeneous computing resources such that expected relative time differences between one update iteration and a next one for determining updated element f(i,k) in the groups of the item model data matrix Y are pairwise below a predefined relative time difference value,
        iteratively determining updated elements f(i,k) in the groups of the item model data matrix Y until convergence,
    such that a computational load for executing the determining updated elements f(k,u) and f(i,k) is evenly distributed across the heterogeneous computing resources.

2. The method according to claim 1, wherein the steps of iteratively determining updated elements f(u,k) in the groups of the user model data, and
    iteratively determining updated elements f(i,k) in the groups of the item model data are performed interleaved.

3. The method according to claim 1, wherein
    a plurality steps of iteratively determining updated elements f(u,k) in the groups of the user model data are performed, before
    a step of iteratively determining updated elements f(i,k) in the groups of the item model data is performed, or
    a plurality steps of iteratively determining updated elements f(i,k) in the groups of the item model data are performed, before
    a step of iteratively determining updated elements f(u,k) in the groups of the user model data is performed.

4. The method according to claim 1, wherein
    building groups of item rows in the sparse training data matrix R is performed depending on the determining groups of user columns in the sparse training data matrix R such that (a) a total volume of communication between the heterogeneous computing resources is minimized when performing the executing the determining updated elements f(u,k) and f(i,k), and (b) the computational load for executing the determining updated elements f(u,k) and f(i,k) is maintained evenly distributed across the heterogeneous computing resources, by defining edges in user-item pairs indicative of an existing rating from a user for an item in the sparse training data matrix R, and minimizing a total number of edges between the heterogeneous computing resources when performing the executing the determining updated elements f(u,k) and f(i,k) by applying a min-cut algorithm.

5. The method according to claim 1, wherein the assigning the groups of the user model data matrix X to respective ones of the heterogeneous computing resources is executed under the condition $$p.\text{capacity}=\alpha(cp*R'/C),\text{ wherein}$$

p.capacity is a total number of rating assignable to one of the heterogeneous computing resources, cp is a relative compute power of a core of one of the heterogeneous computing resources, R' is the total number of ratings in the sparse training data matrix R, C is the sum of all relative compute power of all cores of the heterogeneous computing resources, and $\alpha$ is a value >1 and represents a load imbalance factor indicative of a measure of a maximum load imbalance between the cores of the heterogeneous computing resources.

6. The method according to claim 1, wherein after the steps of the building groups of user columns in the sparse training data matrix R, the assigning the groups of the user model data matrix X to respective ones of the heterogeneous computing resources, the building groups of item rows in the sparse training data matrix R, the assigning the groups of the item model data matrix Y to respective ones of the heterogeneous computing resources, wherein the following steps are performed iteratively (a) the executing determining updated elements f(u,k) in the groups of user data model matrix X, and (b)—executing determining updated elements f(i,k) in the groups of the item model data matrix Y, starting with the step (a).

7. The method according to claim 1, wherein after the steps of the building groups of user columns in the sparse training data matrix R, the assigning the groups of the user model data matrix X to respective ones of the heterogeneous computing resources, the building groups of item rows in the sparse training data matrix R, the assigning the groups of the item model data matrix Y to respective ones of the heterogeneous computing resources, wherein the following steps are performed iteratively (a) the executing determining updated elements f(u,k) in the groups of user data model matrix X, and (b) executing determining updated elements f(i,k) in the groups of the item model data matrix Y, starting with the step (b).

8. The method according to claim 1, wherein the convergence of the step of executing determining updated elements f(u,k) in the groups of the user model data matrix X is indicated by minimizing a cost function.

9. The method according to claim 8, wherein the cost function is given by $$Q=-\log L+\lambda\Sigma_i|f_i|^2+\lambda\Sigma_i|f_u|^2,\text{ wherein}$$

L is ... likelihood function, $\lambda$ is ... parameter, $|f_i|^2$ is ... square of Euclidian norm of vector $f_i$, $f_i \in (r^+)^K$, $r^+$ a positive number, and $|f_u|^2$ is ... square of Euclidian norm of vector $f_u$, $f_u \in (r^+)^K$, K=dimension of f.

10. The method according to claim 9, wherein the likelihood function L is given by $$L=\Pi_{(u,i):r\_u\_i=1}Pr(r\_u\_i=1)*\Pi_{(u,i):r\_u\_i=0}(1-Pr(r\_u\_i=1)),\text{ wherein}$$

a Model Probability Pr is given by $$Pr(r\_u\_i=1)=1-\exp[1-\langle f_u,f_i\rangle],\text{ wherein}$$

$\langle f_u, f_i \rangle$ is the scalar product of the vector $f_u$ and $f_i$, and K=number of co-clusters.

11. The method according to claim 1, wherein each of the heterogeneous computing resources is selected out of the group comprising a single core central processing unit, a multi core central processing unit, a graphics processing unit, a field programmable gate array, a hardware accelerator and an application-specific integrated circuit.

12. A system for parallelizing a training of a model using a matrix-factorization-based collaborative filtering algorithm, the model being used in a recommender system for a plurality of users and a plurality of items, the system comprising a storage unit adapted for providing a sparse training data matrix R of dimension (m×n) in which columns represent m users and rows represent n items such that non-zero entries in the columns of the training data matrix represent ratings of a user in respect to the items, a selection module adapted for selecting a number of K user-item co-clusters from a predefined number range of co-clusters, wherein K<<m and K<<n, and wherein elements of the user-item co-clusters describe a relationship between user and items, a construction unit adapted for building a user model data matrix X of dimension (m×K) and an item model data matrix Y of dimension (n×K), wherein each element f(u,k) in the user model data matrix X becomes a resulting user affinity value of user u to user-item co-cluster k, and wherein each element f(i,k) in the item model data matrix Y becomes a resulting item affinity value of item i to user-item co-cluster k, wherein k ∈{1 ... K}, wherein the construction unit is also adapted for building groups of user columns in the sparse training data matrix R such that a total number of non-zero rating values in each group of the user columns is proportional to a computing capacity of one of heterogeneous computing resources, assigning the groups of the user model data matrix X to respective ones of the heterogeneous computing resources such that expected relative time differences between one update iteration and a next one for determining updated elements f(u,k) in the groups of the user model data matrix X are pairwise below a predefined relative time difference value, iteratively determining updated elements f(u,k) in the groups of the user model data matrix X until convergence, building groups of item rows in the sparse training data matrix R such that a total number of non-zero rating values in each group of the item rows is proportional to a computing capacity of one of heterogeneous computing resources, assigning the groups of the item model data matrix Y to respective ones of the heterogeneous computing resources such that expected relative time differences between one update iteration and a next one for determining updated elements f(i,k) in the groups of the item model data matrix Y are pairwise below a predefined relative time difference value, iteratively determining updated elements f(i,k) in the groups of the item model data matrix Y until convergence, such that a computational load for executing the determining updated elements f(k,u) and f(i,k) is evenly distributed across the heterogeneous computing resources.

13. The system according to claim 12, wherein the construction unit is also adapted for an execution of the activities of iteratively determining updated elements f(u,k) in the groups of the user model data, and iteratively determining updated elements f(i,k) in the groups of the item model data interleaved.

14. The system according to claim 12, wherein the convergence of the activities of executing determining updated elements f(u,k) in the groups of the user model data matrix X is indicated by minimizing a cost function.

15. The system according to claim 14, wherein the cost function is given by $$Q = -\log L + \lambda \Sigma_i |f_i|^2 + \lambda \Sigma_i |f_u|^2, \text{ wherein}$$

L is ... likelihood function,

λ is ... parameter, $|f_i|^2$ is ... square of Euclidian norm of vector $f_i$, $f_i \in (r^+)^K$, $r^+$ a positive, and $|f_u|^2$ is ... square of Euclidian norm of vector $f_u$, $f_u \in (r^+)^K$, K=dimension of f.

16. The system according to claim 15, wherein the likelihood function L is given by $$L = \Pi_{(u,i): r\_u\_i=1} Pr(r\_u\_i=1) * \Pi_{(u,i): r\_u\_i=0}(1-Pr(r\_u\_i=1)), \text{ wherein}$$

a Model Probability Pr is given by $$Pr(r\_u\_i=1) = 1 - \exp[1 - <f_u, f_i>], \text{ wherein}$$

$<f_u, f_i>$ is the scalar product of the vector $f_u$ and $f_i$, and K=number of co-clusters.

17. The system according to claim 12, wherein
each of the heterogeneous computing resources is selected out of the group comprising a single core central processing unit, a multi core central processing unit, a graphics processing unit, a field programmable gate array and an application-specific integrated circuit.

18. A computer program product for parallelizing a training of a model using a matrix-factorization-based collaborative filtering algorithm, the model being used in a recommender system for a plurality of users and a plurality of items, said computer program product comprising a computer readable storage medium having program instructions embodied therewith, said program instructions being executable by one or more computing systems to cause said one or more computing systems to provide a sparse training data matrix R of dimension (m×n) in which columns represent m users and rows represent n items such that non-zero entries in the columns of the training data matrix represent ratings of a user in respect to the items, select a number of K user-item co-clusters from a predefined number range of co-clusters, wherein K<<m and K<<n, and wherein elements of the user-item co-clusters describe a relationship between user and items, build a user model data matrix X of dimension (m×K) and an item model data matrix Y of dimension (n×K), wherein each element f(u,k) in the user model data matrix X becomes a resulting user affinity value of user u to user-item co-cluster k, and wherein each element f(i,k) in the item model data matrix Y becomes a resulting item affinity value of item i to user-item co-cluster k, wherein k∈{1 ... K}, by building groups of user columns in the sparse training data matrix R such that a total number of non-zero rating values in each group of the user columns is proportional to a computing capacity of one of heterogeneous computing resources, assigning the groups of the user model data matrix X to respective ones of the heterogeneous computing resources such that expected relative time differences between one update iteration and a next one for determining updated elements f(u,k) in the groups of the user model data matrix X are pairwise below a predefined relative time difference value, iteratively determining updated elements f(u,k) in the groups of the user model data matrix X until convergence, building groups of item rows in the sparse training data matrix R such that a total number of non-zero rating values in each group of the item rows is proportional to a computing capacity of one of heterogeneous computing resources, assigning the groups of the item model data matrix Y to respective ones of the heterogeneous computing resources such that expected relative time differences between one update iteration and a next one for determining updated elements f(i,k) in the groups of the item model data matrix Y are pairwise below a predefined relative time difference value, and iteratively determining updated elements f(i,k) in the groups of the item model data matrix Y until convergence, such that a computational load for executing the determining updated elements f(k,u) and f(i,k) is evenly distributed across the heterogeneous computing resources.

* * * * *